United States Patent
Clabburn

[11] 3,721,749
[45] March 20, 1973

[54] HEAT RECOVERABLE ARTICLES

[75] Inventor: Robin James Thomas Clabburn, Highworth, England

[73] Assignee: Rachem Corporation, Menlo Park, Calif.

[22] Filed: Nov. 16, 1970

[21] Appl. No.: 89,742

[52] U.S. Cl. ..........................174/88 R, 174/DIG. 8
[51] Int. Cl. .............................................H01r 5/00
[58] Field of Search..........................174/88, DIG. 8

[56] References Cited

UNITED STATES PATENTS

| | | |
|---|---|---|
| 3,243,211 | 3/1966 | Wetmore..................174/DIG. 8 UX |
| 3,538,240 | 11/1970 | Sherlock............................174/88 R |

OTHER PUBLICATIONS

Pamcor, Inc., "How to Select and Use Heat Shrink Products," Catalog No. L-79C, Feb. 1970, pp. 1, 7 and 10 relied on, Published by American Pamcor, Inc., Valley Forge, Pa.

*Primary Examiner*—Bernard A. Gilheany
*Attorney*—Lyon & Lyon

[57] ABSTRACT

Described herein are means for simultaneously connecting multi-conductor flat cable to other such cable or to terminals of connector blocks or the like while providing for electrical insulation and environmental isolation of the resulting connections. The connection means comprise an open-ended hollow heat recoverable member having a train of longitudinal seams disposed across the width thereof integrally bonding the opposed walls thereof to one another to define and integrally connect a plurality of spaced parallel tubular members sized to receive individual conductors of the cable whereupon, in operation, the tubular members are heat recovered therearound. A soldered joint is formed between individual conductors of the cable and conductors or terminals of the device to which the cable is to be connected within said tubular members which serve to electrically insulate one connection from adjacent connections. Solder inserts may be positioned within the tubular members so that upon heat recovery of the connection device the solder fuses to form a permanent connection while simultaneously the connection device heat shrinks to isolate and insulate the formed connections. Fusible rings of polymeric material may be positioned within the tubular members to form solder dams. The heat recoverable connection device is preferably transparent to permit inspection of the formed connections.

14 Claims, 8 Drawing Figures

INVENTOR.
ROBIN JAMES THOMAS CLABBURN
BY Lyon+Lyon
ATTORNEYS.

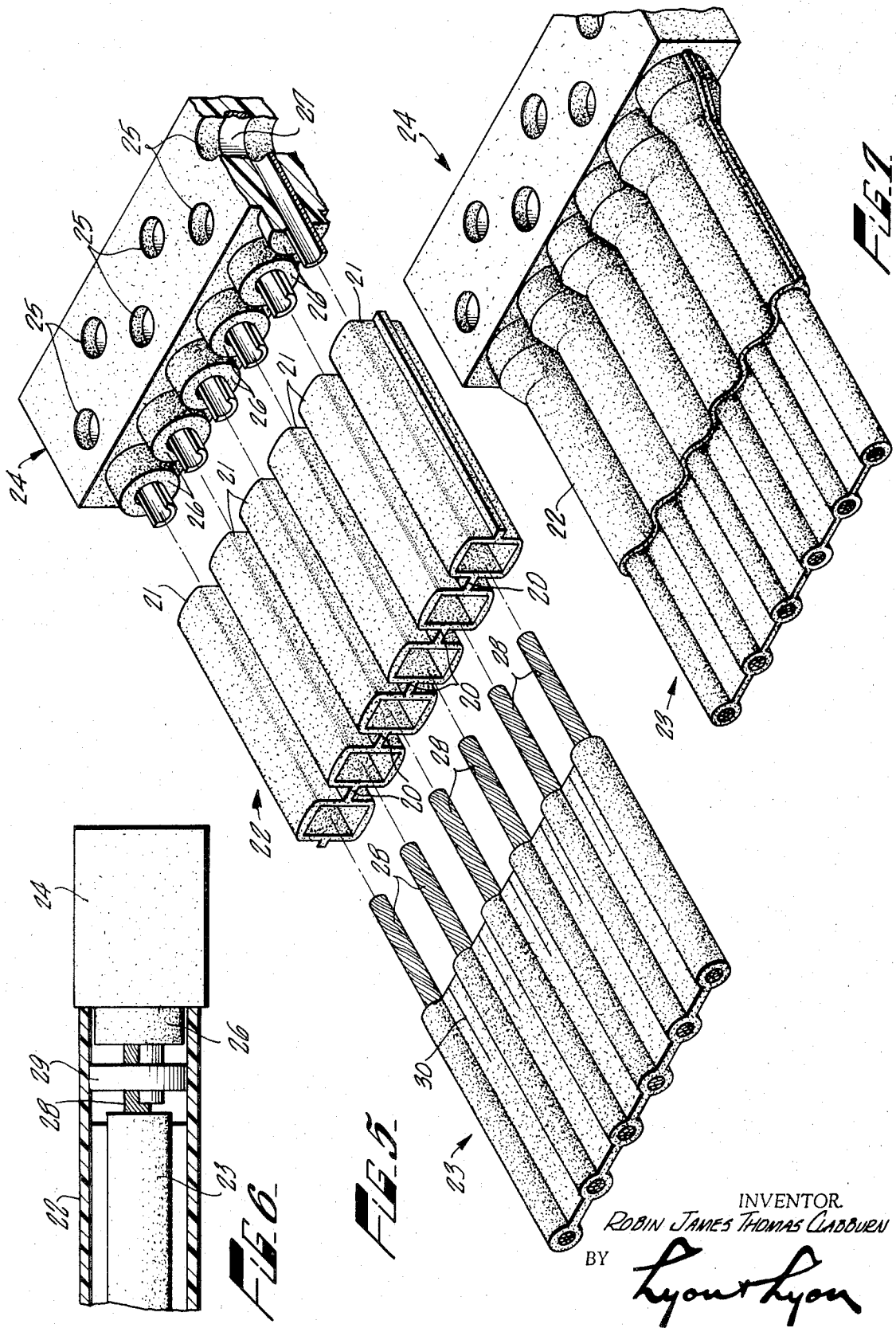

HEAT RECOVERABLE ARTICLES

FIELD OF THE INVENTION

This invention relates to means for terminating flat cable and, more particularly, to heat shrinkable means therefor.

BACKGROUND OF THE INVENTION

In many instances it is desirable to cover or encapsulate one or more articles with a heat recoverable sleeve. In general, such sleeve is made of a material having plastic or elastic memory which is expanded at elevated temperature to a diameter greater than its normal diameter and then cooled while maintained in the enlarged dimension. A sleeve treated in this manner will retain its expanded position until it is again heated, at which time it will recover to its original shape. Examples of such heat recoverable sleeves may be found in Currie, U.S. Pat. No. 2,027,962 and Cook, et al, U.S. Pat. No. 3,086,242, the disclosures of which are incorporated herein by reference.

A particular area in which recoverable sleeves of this type are extremely useful is in the making of insulated soldered connections between electrical conductors such as between a terminal on a piece of electrical apparatus and a wire, or between two wires. Generally this is accomplished by providing the recoverable sleeve with an internal ring or ball of solder, passing the electrical conductors into the two ends of the sleeve and heating this assembly so that the sleeve recovers to its original shape and the solder melts and joins the two conductors. The result is a good electrical connection which is insulated and protected by the sleeve. A preferred method of making such an electrical connection is disclosed in Wetmore, U.S. Pat. No. 3,243,211, the disclosure of which is incorporated herein by reference. While electrical connection has been greatly facilitated by such solder sleeves, installation of individual solder sleeves has sometimes been relatively difficult when it is desired, for example, to connect a flat cable containing as many as 20 or more closely spaced individual conductors to another such cable, or to the pins of a terminal block.

It has previously been proposed to simultaneously connect a plurality of individual wires by resort to a plurality of individual solder sleeves held together by a metal clip or other mechanical device. Upon recovery of the individual solder sleeves, the mechanical device is discarded. Machines have also been provided for simultaneously terminating the conductors of a flat cable with individual solder sleeves. While these proposals have received widespread acceptance in the industry, there are applications where their use is inconvenient, yet where such terminations are highly desirable.

BRIEF SUMMARY OF THE INVENTION

According to this invention there is provided a heat recoverable article suitable for electrical connection of multi-conductor flat cable, comprising an open-ended hollow heat recoverable member having a train of longitudinal seams disposed across the width thereof integrally bonding the opposed walls thereof to one another to define and integrally connect a plurality of spaced parallel tubular members sized to receive individual conductors of the cable whereupon, in operation, the tubular members are heat recovered therearound. No clips or other mechanical devices are required to hold the individual tubular members in the proper spaced relation, one from another.

One object of this invention is to provide means whereby a plurality of flat cable conductors can be simultaneously joined to the conductors of a second flat cable or to the terminals of an electrical connection device.

Another object of the invention is to provide for simultaneous connection of a plurality of conductors by use of heat recoverable articles within which the conductors are connected in spaced relation, one to the other.

These and other objects and advantages of the invention will become apparent from the detailed description which follows and from the attached drawings which like numerals refer to like elements and wherein.

Figure 8:
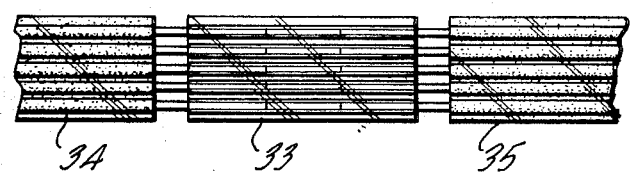

FIG. 5 pictorially illustrates in exploded fashion the relationship of typical electrical devices suited for connection according to the invention;

FIG. 6 is a partially sectioned elevation illustrating the relationship of the elements of FIG. 5 just prior to heat recovery and solder connection;

FIG. 7 is a pictorial view of the elements of FIG. 5 following heat recovery and soldered connection; and FIG. 8 illustrates a manner in which an embodiment of the invention can be employed to electrically connect to flat cables.

DETAILED DESCRIPTION OF THE INVENTION

As used herein, "flat" cable refers to insulated cable containing a plurality of conductors generally aligned in a single plane. Such cable includes "ribbon" cable, i.e., cable whose major surfaces are corrugated by reason of the variance in thickness as between the insulative webbing separating individual conductors of the cable and the insulation immediately adjacent the individual conductors themselves. Also included, of course, is truly flat, smooth-surfaced cable.

The flat cable with which the invention is employed contains from about two to 60 or more individual conductors, preferably from about 10 to about 60 conductors, and most preferably from about 20 to about 60 conductors. The number of conductor-receiving tubular members is, of course, determined by the number of cables and cable-contained conductors to be connected by a single heat recoverable article. Preferably, the spacing between individual cable conductors is from about 50 to 150 mils and the spacing between longitudinal axes of the said tubular members is approximately equal to that between the cable conductors themselves.

Figure 1:
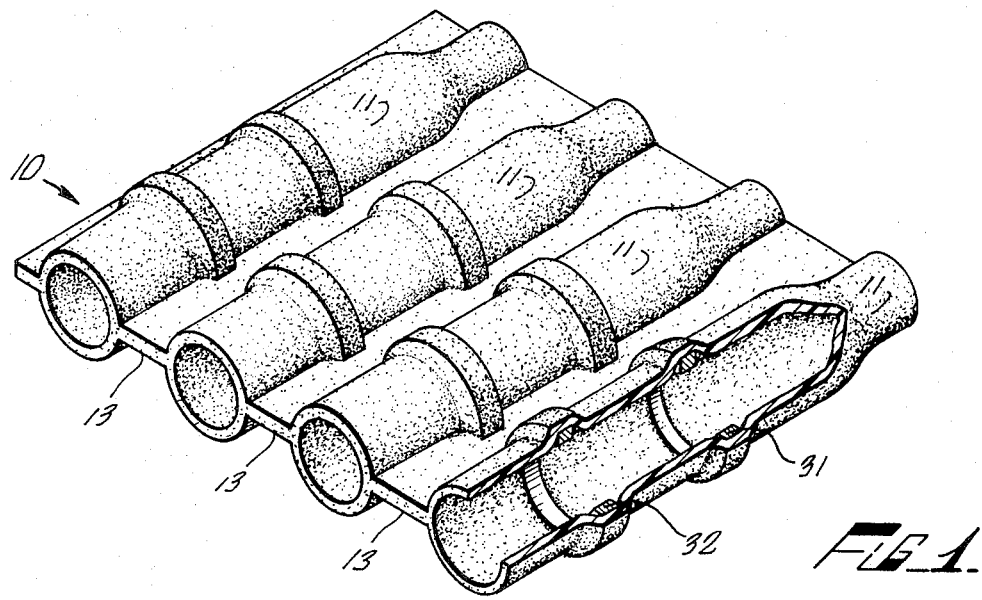
FIG. 1 is a partially cut away pictorial illustration of a portion of one of the articles according to this invention.
Figure 2:
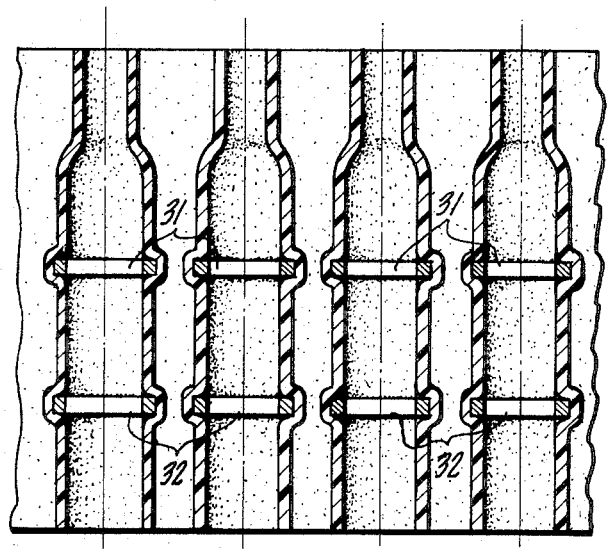
FIG. 2 is a sectioned plan view of the article of FIG. 1.

Flat cable can be connected to another such cable or to terminals of an electrical conducting device with the heat recoverable connection device 10, sectional views of which are presented in FIGS. 1 and 2. With reference now to FIG. 1, the heat recoverable member 10 is provided with spaced parallel tubular members 11 integrally connected by a train of longitudinal seams 13 disposed across the width of the member 10 and integrally bonding to one another the opposed walls of a hollow member from which the article of FIG. 1 is preferably formed. Integral bonding refers to bonding sufficient to resist the peeling force of the expansion process employed to impart heat recoverability. Such bonding is most advantageously achieved by fusion bonding as by solvent bonding, or, preferably, by the employment of heated platens or rollers. Alternatively, the elements to be so bonded can be heated to an appropriate temperature and bonding achieved by the employment of unheated rollers or platens. The formed tubular members 11 are depicted in FIG. 1 as being of non-uniform cross-section along their lengths but that is not necessary, as appears from the article of FIG. 3 whose tubular members 14 integrally connected by seams 15 are of uniform cross-section along their respective lengths.

Figure 3:
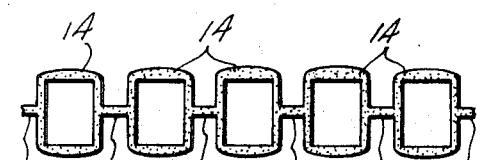
FIG. 3 is an elevation of a second embodiment of the invention.
Figure 4:
FIG. 4 depicts the article of FIG. 3 heat recovered about a plurality of flat cable conductors.

FIG. 4 illustrates an article resulting from heat recovering the article of FIG. 3 down about flat cable conductors 16 inserted in the tubular members 14 prior to heat recovery thereof.

One advantage of the invention is immediately apparent from FIG. 4, that is, the ability of the articles of the invention to assume upon heat recovery a configuration little larger than the cable about which they are recovered. Thus, for example, typical flat cable bears insulation on the order of about 25 mils in thickness, the individual conductor ranging in thickness from about 3 to about 5 mils. Typical of the connectors which have been produced according to this invention are those whose expanded wall thickness ranges from about 3 to 5 mils. Of course, the articles of the invention can be made in any desired size dependent upon the use contemplated, but the foregoing example makes apparent that the connection devices of the invention can be employed to insulate flat cable conductor connections without unduly increasing the cable profile. Indeed, the recovery characteristics of the articles which can be made according to this invention are such that the recovered article sometimes appears to have been extruded onto the conductive elements about which it is recovered, as appears from FIG. 4.

The opposed walls bonded by longitudinal seams 13, 14, etc., can be those of a previously extruded or otherwise formed hollow article. Preferably, however, those opposed walls are presented by first and second plies integrally bonded to one another along the lateral edges thereof, forming the lateral longitudinal seams depicted at 17 and 18 in FIG. 3. The seams 15 can be simultaneously or subsequently formed. Alternatively, the hollow member from which the connection device of the invention is made can be formed from a single ply one pair of whose lateral edges have been brought into adjacency by folding of the ply and integrally bonded to one another to form a single, longitudinally aligned seam 19, as shown in the connection device of FIG. 5. The opposed walls thereby presented to one another can be simultaneously or subsequently longitudinally bonded to form the seams 20 defining and interconnecting the tubular members 21.

The heat recoverable connection devices of the invention are formed from material comprising polymeric material capable of having plastic or elastic memory imparted thereto. Materials having such memory have been dimensionally changed from an original heat stable configuration to a dimensionally heat unstable configuration tending to move in the direction of the original configuration upon the application of heat alone. The terms "plastic memory" and "elastic memory" are used interchangeably herein and are intended to be mutually inclusive.

Examples of such heat recoverable materials are found in Currie, U.S. Pat. No. 2,027,962 and Cook et al., U.S. Pat. No. 3,086,242. One method of making a heat recoverable material consists in exposing a thermoplastic material to an amount of heat which is insufficient to allow the material to melt but sufficient to allow the molecular structure to become distorted; and then distorting the material to a new configuration and cooling the material in its distorted state. Subsequent increases in temperature sufficient to reduce locked-in stresses caused by the initial plastic deformation will cause the article to tend to recover to its initial state.

Another manner in which heat recoverable articles are generally made involves the formation of a polymeric article having a first dimension, followed by crosslinking of the polymer. The crosslinking can be effected by chemical means, e.g., with peroxides, or by irradiation or by combinations of the two. Radiation employed can be of various types including charged particles, i.e., beta and alpha, neutral particles, i.e., neutrons, and electromagnetic, i.e., gamma and ultraviolet, as is well known. Subsequent heating of the material will melt the crystals in a crystalline thermoplastic material or significantly lessen other internal molecular forces such as hydrogen bonding or dipole-dipole interactions to an extent sufficient to allow distortion of the product. Upon cooling of the heated and distorted article, there is obtained a product which remains in its distorted shape while at room temperature, due to the reformation of strong interchain forces such as cyrstallinity which at low temperatures dominate the contrary stresses resulting from crosslinking. Upon reheating, the crosslink forces become dominant and the material tends to recover to its original geometry.

When irradiation is used, doses of any desired amount can be used although, generally, a dosage of from 5 to 50 megarads will be sufficient.

Following expansion of a meterial capable of having elastic memory (heat recoverability) imparted thereto at elevated temperature to a new dimension, the temperature of the material is lowered to a temperature less than that at which expansion occurs and below a transition temperature of the material. Stress imparted by the expansion is thereby deposited in the material's "memory bank" for subsequent withdrawal upon raising the temperature to its heat recovery temperature. As is well understood in the heat recovery art, advantage can be taken of various transition points such as crystalline melting points or glass transition points. As used herein, the terms crystalline melting point and crystalline melting temperature are considered to be synonymous as representing the temperature or temperature range at or within which crystalline or a crosslinked crystalline polymeric material changes from the crystalline to the amorphous state. Glass transition temperature and glass transition point are considered synonymous as representing the temperature or temperature range at or within which a hard, amorphous material softens.

As exemplary of the polymeric materials to which heat recoverability can be imparted by the above and other means may be mentioned polyethylene, polybutene, various copolymers of ethylene, propylene and butene, polyvinyl halides, e.g., polyvinyl chloride; polyacrylates; polyamides, e.g., nylon 6 or nylon 66; polyesters, e.g., polyethylene terephthalate; fluorocarbon polymers such as polytetrafluoroethylene; ionomers, polyurethanes, and other materials such as epoxy resins. Particularly preferred are vinylidene fluoride polymers such as polyvinylidene fluoride (e.g., Kynar), vinylidene fluoride-hexafluoropropene copolymer (Viton, available from DuPont Company), and vinylidene fluoride-chlorotrifluoroethylene copolymer (Kel-F, available from the Minnesota Mining and Manufacturing Company). Any of the foregoing materials can be acted upon by the process of this invention, although it is preferred that cross-linked polymeric material be employed.

Turning now to FIGS. 5 and 6, a heat recoverable connector 22 formed as described hereinabove and having a plurality of spaced parallel tubular members 21 interconnected by seams 20 is employed to connect a multi-conductor cable 23 to connector block 24. The connector block 24 is provided with female terminals 25 and 26 having interleaf spring contact members 27. An extension of element 27 forms a cup protruding from each of the terminals 26. The individual conductors 28 of ribbon cable 23 may be tinned and solder provided in the said cups. Preferably, however, a solder insert containing predetermined proportions of solder and flux like the solder ring 29 is held within each of the tubular members in abutting relation to the walls thereof. To form a soldered connection between the ribbon cable 23 and connector block 24 the individual conductors 28 and the protruberant lips of terminals 26 are inserted through opposite ends of the tubular members 21. The insulation between individual conductors of cable 23 is, in the preferred embodiment, trimmed past the point to which the conductors have been bared, as by cuts 30, to permit portions of the insulation about the individual cable conductors to be inserted within the tubular members 21.

When the assembly formed as described above is heated to the recovery temperature of the heat recoverable article 22 and the melting point of the solder ring 33, the edges of the article 22 adjacent cable 23 and connector block 24 shrink to respectively engage cable 23 and the protuberant portions of terminals 26. As heating continues, the flux flows to prepare the surfaces and the solder melts to form the joint. The tubular members 21 continue to shrink, pressing the conductors 28 into the molten solder while at the same time controlling the flow of the solder. Upon cooling, the solder hardens and the sleeve cools to provide an insulated solder connection. The shrinking action of the article 22 assures close proximity of the metals to be joined and lack of movement during cooling, two requirements which must be met for good solder joints.

The resulting soldered assembly is illustrated in FIG. 7, and the electrically insulating and environmentally isolating nature of the recovered connector 22'. The insulation thereby provided to the formed soldered connections can be enhanced if the tubular members 22 are made to hold in abutting relation with the interior walls thereof one or more fusible rings of polymeric material like those shown at 31 such that upon recovery the fusible material is caused to flow toward and fill declivities in the formed connection. Preferably, the fusible polymeric material bonds to connector block and other insulation. The fusible polymeric material may comprise virtually any material capable of being rendered flowable by the application of heat. For example, conventional thermoplastic materials such as polyolefins (polyethylene, polypropylene, etc.), polyamides (e.g., nylon), polyesters (e.g., polyethylene terephthalate, cellulose acetate) and other similar materials can be used. It is, however, to be understood that the fusible polymeric insert need not be a conventional thermoplastic. Rather, thermosetting materials such as epoxy resins, polyurethanes, phenol-aldehyde condensation products, etc., may be used. Still further, it is possible to use, in combination with the heat shrinkable material certain materials which will not operate in precisely the same manner as fusible materials, such as insulating greases, heat catalyzed adhesives and the like.

Fusible rings of polymeric material are used to best advantage in conjunction with solder inserts. For example, with reference to FIGS. 1 and 2, solder inserts 32 are positioned within tubular members 11 and adjacent thereto in abutting relation to the walls of the tubular members are fusible rings 31 of polymeric material. In the course of recovery the ring 31 melts and flows to ultimately provide enhanced insulation of the soldered connection formed within tubular member 11. At the same time, the melted material acts as a solder dam, directing the flow of the fused solder. It will be apparent, of course, that one fusible ring of polymeric material can be placed on either side of solder insert 32.

The solder inserts which abut the walls of the tubular members 11 can be in ring, U, bar, ball or other form. The solder inserts and fusible rings of polymeric material can be force fit within the tubular members or, alternatively as shown in FIGS. 1 and 2, the tubular members can be pre-recovered about a mandrel to firmly engage the contained solder inserts and polymeric rings.

FIG. 8 illustrates a second type of connection with which the connectors of the invention are advantageously employed. In FIG. 8 a transparent heat recoverable connector 33 is positioned between flat cables 34 and 35, the individual conductors thereof having been partially inserted within the tubular members of connector 33. Solder inserts can be inserted within the tubular members of device 33 or, alternatively, the individual flat cable conductors can be tinned for soldered connection. Transparency, as used herein, refers to that property of the material which transmits visible light without scattering sufficient to render soldered connections beyond incapable of visual inspection. Transparency and the attendant ability to inspect soldered connections can be had simply by appropriate choice of material.

In recovering the connectors of the invention and fusing their contained solder inserts and fusible rings of polymeric material, resort can be had to hot air, infrared, thermal conduction or high frequency induction heating. Suitable temperatures of operation are determined upon a balance of considerations such as the melting point of the solder and contained fusible polymeric rings and the recovery temperature and degradation point of the heat recoverable connector device itself. For example, polyethylene connectors are preferably employed with low temperature solder such as Indium I which melts at about 279°F. Other heat shrinkable materials, such as vinylidene fluoride polymers, can be employed with solder melting at, e.g., 450°–600°F.

The heat recoverable connector devices of the invention can be continuously manufactured. For example, first and second plies of material capable of having heat recoverability imparted thereto can be unwound from rolls and their lateral edges continuously bonded together to form a hollow member. Simultaneously or thereafter the opposed walls of the formed hollow member can be integrally bonded by passing the member between heated rollers adapted to form trains of longitudinal seams across the member to define tubular members therein. The elongate article so formed can then be irradiated, heated, pneumatically expanded and cooled in expanded condition, all as shown in the aforementioned Cook patent. If desired, the continuously formed hollow member can be partitioned into discrete isolated tubular member-containing envelopes by forming lateral bonded seams across the width of the hollow member and the resulting envelopes continuously needle-expanded as disclosed in Hughes, et al. U.S. Pat. No. 3,303,243, the disclosure of which is incorporated herein by reference. In either event, the continuously formed heat recoverable tube can then be cut to form individual heat recoverable connectors like those described hereinabove.

Where size permits the heat recoverable connectors of the invention can be provided with inserts providing mechanical advantage in aid of recovery forces e.g., lever-, scissors-, and spiral spring-type devices. The connectors of the invention have been described primarily with regard to soldered joinder of electrical conductors, but it will be apparent that the devices of the invention can be employed, even without solder, in any case in which it is desired to connect and encapsulate pluralities of elements, one to the other. These and other variant applications of the invention will occur to the art-skilled in light of the foregoing disclosure.

The heat recoverable connectors of the invention provide strain relief to soldered connections. In preferred embodiments their transparency makes possible visual inspection of formed electrical connections. By the invention a plurality of conductors may be individually terminated in such fashion as to insulate one termination from another. Further, there is provided by the invention a means of simultaneously terminating a multiplicity of conductors while electrically insulating and environmentally protecting the formed connections. The embodiments heretofore described as providing these advantages are to be considered in all respects as illustrative rather than restrictive, the scope of the invention being indicated by the appended claims rather than by the foregoing description, and all changes which come within the meaning and range of equivalency of the claims are intended to be embraced therein.

I claim:

1. An open-ended heat recoverable article suitable for electrical connection of multi-conductor flat cable comprising a hollow heat-shrinkable polymeric member heat recoverable to a flat configuration and having a train of longitudinal seams disposed across the width thereof integrally bonding the opposed walls thereof to one another to define and integrally connect along their length a plurality of spaced parallel tubular members sized to receive individual conductors of said cable, the spacing between the longitudinal axes of said tubular members being approximately equal to that between conductors of said cable whereupon, in operation, said tubular members are heat recovered therearound while maintaining the center-to-center distance therebetween.

2. An article according to claim 1 wherein the said opposed walls are respectively defined by first and second plies integrally bonded to one another along the lateral edges thereof.

3. An article according to claim 1 wherein the said opposed walls are presented by the interior walls of a ply whose lateral edges have been brought into adjacency and integrally bonded one to the other.

4. An article according to claim 1 which additionally comprises a fusible solder insert firmly held in each of said tubular members in abutting relation to the walls thereof.

5. An article according to claim 4 which additionally comprises a fusible ring of polymeric material held in each of said tubular members in abutting relation to the walls thereof.

6. An article according to claim 1 which additionally comprises a fusible ring of polymeric material held in each of said tubular members in abutting relation to the walls thereof.

7. An article according to claim 6 wherein the polymeric material of said fusible ring is thermosetting.

8. An article according to claim 5 wherein the polymeric material of said fusible ring is thermosetting.

9. A transparent article according to claim 1 having from about 10 to about 60 of said tubular members.

10. An article according to claim 1 wherein said heat recoverable member comprises a crystalline polymeric material exhibiting elastomeric properties when heated to a temperature at least equal to its crystalline melting temperature.

11. An article according to claim 1 wherein said heat recoverable member comprises a crosslinked polymer.

12. An article according to claim 11 wherein said heat recoverable member comprises a crosslinked polyolefin.

13. An article according to claim 11 wherein said polymer is a vinylidene fluoride polymer.

14. An article according to claim 13 wherein said polymer is a vinylidene fluoride hexafluoropropene copolymer.

* * * * *